United States Patent [19]

Andersen

[11] 4,138,769
[45] Feb. 13, 1979

[54] APPARATUS FOR MECHANICALLY PEELING SHRIMP AND SIMILAR CRUSTACEANS

[75] Inventor: Erik Andersen, Ballerup, Denmark

[73] Assignee: Matcon Radgivende Ingeniørfirma ApS, Denmark

[21] Appl. No.: 782,228

[22] Filed: Mar. 28, 1977

[30] Foreign Application Priority Data

Apr. 21, 1976 [DK] Denmark .............................. 1795/76

[51] Int. Cl.² .............................................. A22C 29/02
[52] U.S. Cl. .............................................. 17/73; 17/48
[58] Field of Search .......................... 17/71, 72, 73, 48

[56] References Cited

U.S. PATENT DOCUMENTS

| | | | |
|---|---|---|---|
| 2,047,688 | 7/1936 | Jenkins | 17/48 |
| 2,712,152 | 7/1955 | Samanie | 17/48 |
| 2,853,733 | 9/1958 | Greiner | 17/73 |
| 3,084,379 | 4/1963 | Henning | 17/73 |
| 3,203,039 | 8/1965 | Glidden | 17/48 |
| 3,594,860 | 7/1971 | Nelson et al. | 17/48 |
| 3,875,614 | 4/1975 | Lapeyre | 17/73 |
| 4,004,321 | 1/1977 | Harrison | 17/48 |

*Primary Examiner*—Russell R. Kinsey
*Assistant Examiner*—Paul J. Hirsch
*Attorney, Agent, or Firm*—Lane, Aitken & Ziems

[57] ABSTRACT

An apparatus for peeling shrimps comprises two rollers each associated with a concave shrimp supporting surface extending approximately along 180° in parallel with the roller surface. Cutting elements extend from the supporting surface into the elongated gap between each supporting surface and the opposed roller, and rods, which are radially movable in apertures in the roller, extend into the gap from the opposite side. Due to centrifugal action resulting from rotation of each roller, some of the rods engage shrimps fed into one end of the gap and press them against the cutting elements while other rods act to advance the shrimps longitudinally of the gap and expose one lateral surface of each shrimp to a shell cutting action. The rollers are arranged and driven such that both sides of each shrimp are subsequently acted upon in the first and second gap, respectively.

4 Claims, 8 Drawing Figures

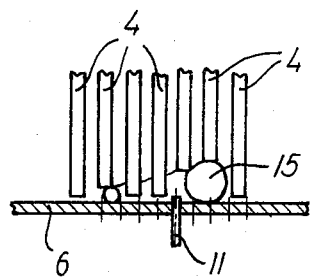
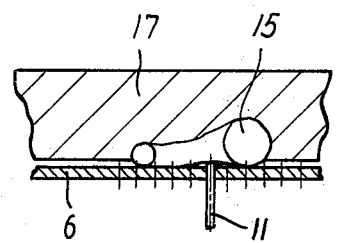
FIG. 5    FIG. 6
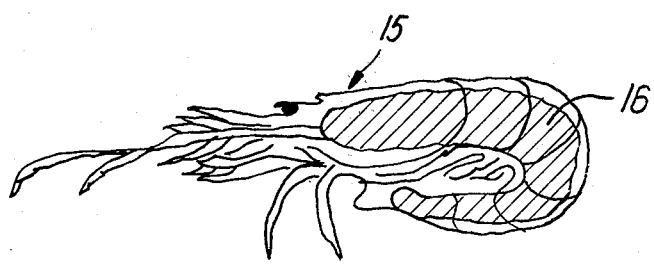
FIG. 7

APPARATUS FOR MECHANICALLY PEELING SHRIMP AND SIMILAR CRUSTACEANS

BACKGROUND OF THE INVENTION

The present invention relates to apparatus for mechanically peeling shrimps and similar crustaceans, which apparatus comprises support means defining a shrimp supporting surface, cutting means projecting from said supporting surface and means located opposite said supporting surface for advancing a shrimp along said surface and at the same time press the shrimp towards the supporting surface and the cutting means projecting from that surface.

An apparatus of this kind is disclosed in the specification of U.S. Pat. No. 3,084,379 issued Apr. 9, 1963, to W. Henning. In this known apparatus the lateral surface of the shrimp is pressed against a flat supporting surface by means of a rotating roller having a resilient covering, and the cutting means comprises a cylindrical milling cutter rotating on an axis parallel to the axis of the pressing roller in order to peel the shell off the shrimp on the flattened side thereof. While this apparatus may be suitable for peeling deepwater prawn (*Pandalus borealis*) it will hardly be able to peel the so-called brown or common shrimp (*Crangon crangon* or *Crangon vulgaris*) in a satisfactory way, primarily because the shell of *Crangon crangon* is very hard and smooth or slippery as compared with *Pandalus borealis*, and its edible meat has a markedly "rubber-like" character.

The aforesaid U.S. patent specification also describes an apparatus in which the pressure roller is mounted opposite a cutting roller consisting of circular cutters alternating with spacer discs which latter act as a substitute for the flat supporting surface of the first discussed apparatus. The cutters effect a series of parallel cuts through the shell and when the shell has been cut on both sides the shrimp is dried by alternate heating and cooling whereby the shell is loosened from the meat. The drying of the shrimp influences the quality and the taste of the meat in an unfavourable manner.

BRIEF SUMMARY OF THE INVENTION

It is an object of the present invention to provide an apparatus which permits to effect a mechanical peeling of shrimp and similar crustaceans or crayfish, especially but not exclusively *Crangon crangon*, by a very gentle treatment.

According to the invention there is provided an apparatus for mechanically peeling shrimp and similar crustaceans, comprising support means defining a shrimp supporting surface having an inlet and an outlet end, a pressing means located opposite said shrimp supporting surface and shaped so as to define therewith an elongated gap of at least substantially constant depth perpendicular to said supporting surface, drive means for moving said pressing means relative to said supporting means in the longitudinal direction of said gap, a plurality of cutting elements projecting from said supporting surface into said gap, said pressing means being arranged to press a shrimp fed into said gap towards said cutting elements and at the same time advance it longitudinally of the gap responsive to said relative movement of said pressing means.

It has been found that with an apparatus according to the invention it is possible to break up the shell of the shrimp in such small flakes or chips that they can be separated practically speaking completely from the edible shrimp meat by a subsequent rinsing in water and then removed from the meat, e.g. by means of an air current. This is believed to be due to the fact that the design of the support member and the opposed shrimp advancing and pressure excerting means permits the provision of a large number of cutting elements in the gap between said means, so that the assembly of cutting elements cover the entire shell area of each shrimp which is fed through the gap. Consequently, when the shrimp is discharged from the outlet end of the gap there is no part of the shell which has not been loosened from the edible meat by the action of the cutting elements. The large number of cutting elements and their distribution over a relatively large area of the supporting surface also ensures that the cutting force excerted by each element can be kept at a rather low value as compared to the forces which are necessary in the known apparatus referred to above and which may cause damage to the meat. The risk of damaging the meat is further reduced due to the fact that the close spacing of the cutting elements may make it unnecessary to let them cut through the full thickness of the shell. In several cases a "scratching" action, which extends only through part of the shell thickness, may be sufficient.

According to a preferred embodiment of the invention the shrimp pressing means comprises a rotatable roller, and the shrimp supporting surface is a concave cylindrical surface coaxial with the roller. This permits a compact design of the shell cutting units comprising the pressing means and the opposed cutting elements, and two such units for successively effecting cutting operation on either side of the shrimp can be built together in a very simple and compact way without requiring any separate means for ensuring correct lateral orientation of the shrimp during its transfer from the first to the second unit. The apparatus then comprises a first and a second rotatable roller each associated with an opposed shrimp supporting surface, the outlet end of the first supporting surface being located adjacent and substantially tangential to the periphery of the second roller, and the inlet end of the second supporting surface being located adjacent and substantially tangential to the periphery of the first roller, while the roller drive means are arranged to rotate the rollers in opposite directions.

Preferably the peripheral surface of the or each pressing roller is perforated by a plurality of evenly distributed apertures, and the apparatus comprises a plurality of rods each mounted for radial movement in one of said apertures and provided with stop means for limiting its movement outwardly from the rotational axis of the roller, which rods constitute the means for advancing shrimps through said gap and pressing the shrimps towards the cutting elements.

During rotation of the roller each rod will be subjected to an outwardly directed centrifugal force, the magnitude of which is practically speaking independent of variations in the thickness of that part of a shrimp which may be present between the end surface of the rod and the opposed stationary cutting element. Consequently, the centrifugal forces on the rods ensure that during the shell pressing operation all parts of the shrimp surface are subjected to a uniform specific pressure. One or more of the rods, which are located between the shrimps and which under the influence of the centrifugal force are maintained in their outer end positions as defined by the associated stop means, will act as drivers which in response to the rotation of the roller forcibly advance the shrimp through the gap between the roller and the cutting elements.

The breaking and loosening of the shell, in particular the tail shell, will be more complete the closer the rods are spaced in the roller surface, and it is expedient to arrange the rods in a regular array with a pitch dependent on the diameter of the rods and the average size of the shrimps.

The cutting elements may be pins which are removably mounted in the supporting means and arranged in a plurality of rows extending transversely of said gap behind one another, the pins of each row being staggered in the transverse direction of the gap relative to the pins of a neigbouring row. It is then readily possible to replace a worn or damaged cutting element, and the cutting elements may be made with a relatively large cross-sectional area which ensures an appropriate rigidity and mechanical strength of the elements.

In order to counteract the risk of the cutting elements being damaged or pressed out of the support means when stone or other hard foreign matter is present in the catch of shrimp being processed, each cutting pin may extend with a radial clearance through an aperture in the supporting surface and there may be provided abutment means associated with each pin for defining a maxiumum distance from said supporting surface to the cutting end of the pin while each pin is spring-biased against its associated abutment means.

BRIEF DESCRIPTION OF THE DRAWINGS

The invention will now be described in more detail with reference to the accompanying schematical drawings in which FIG. 5 is an fractional view of FIG. 3 for illustrating the action to which the shell of a shrimp is subjected in the apparatus, FIG. 6 is a view corresponding to FIG. 5 but showing a different embodiment of the pressing and shrimp advancing means, FIG. 7 is a plan view of a shrimp on a larger scale.

DETAILED DESCRIPTION

Figures 1, 2:
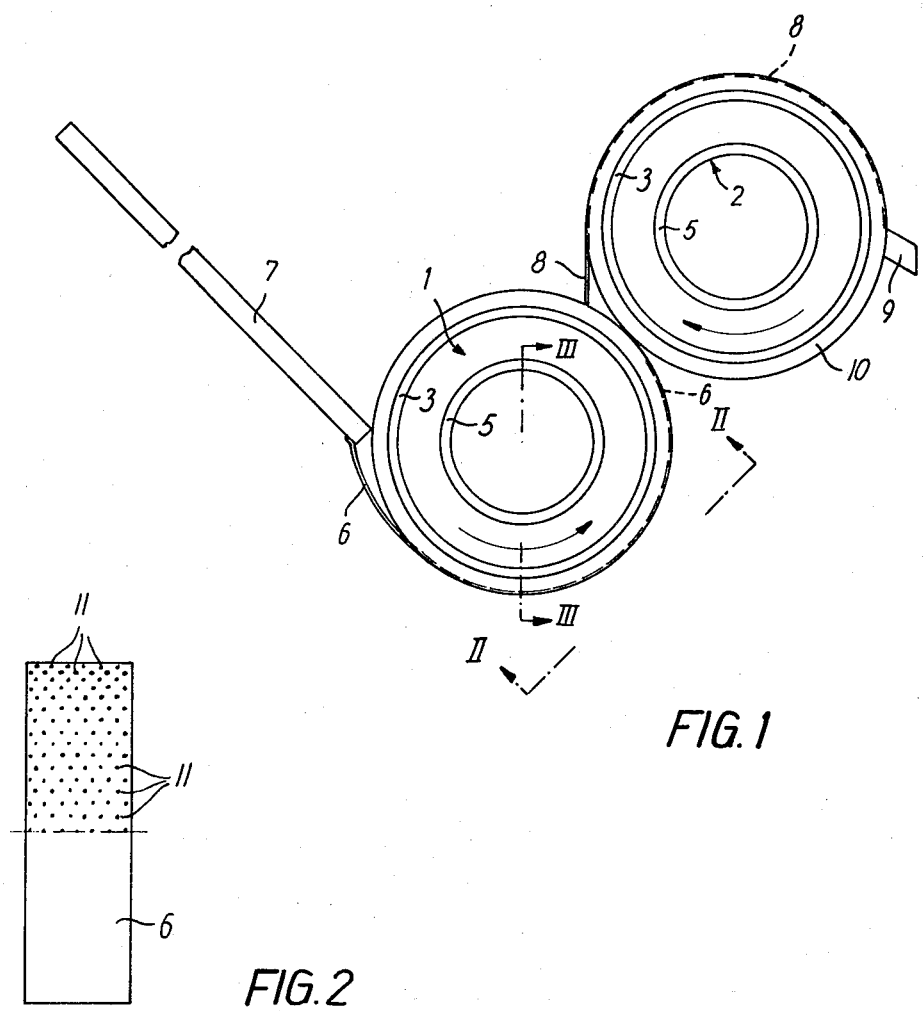
FIG. 1 is an elevation of two cutting units in an apparatus embodying the invention.
FIG. 2 is a view in the direction of arrows II—II in FIG. 1.
Figures 3, 4:
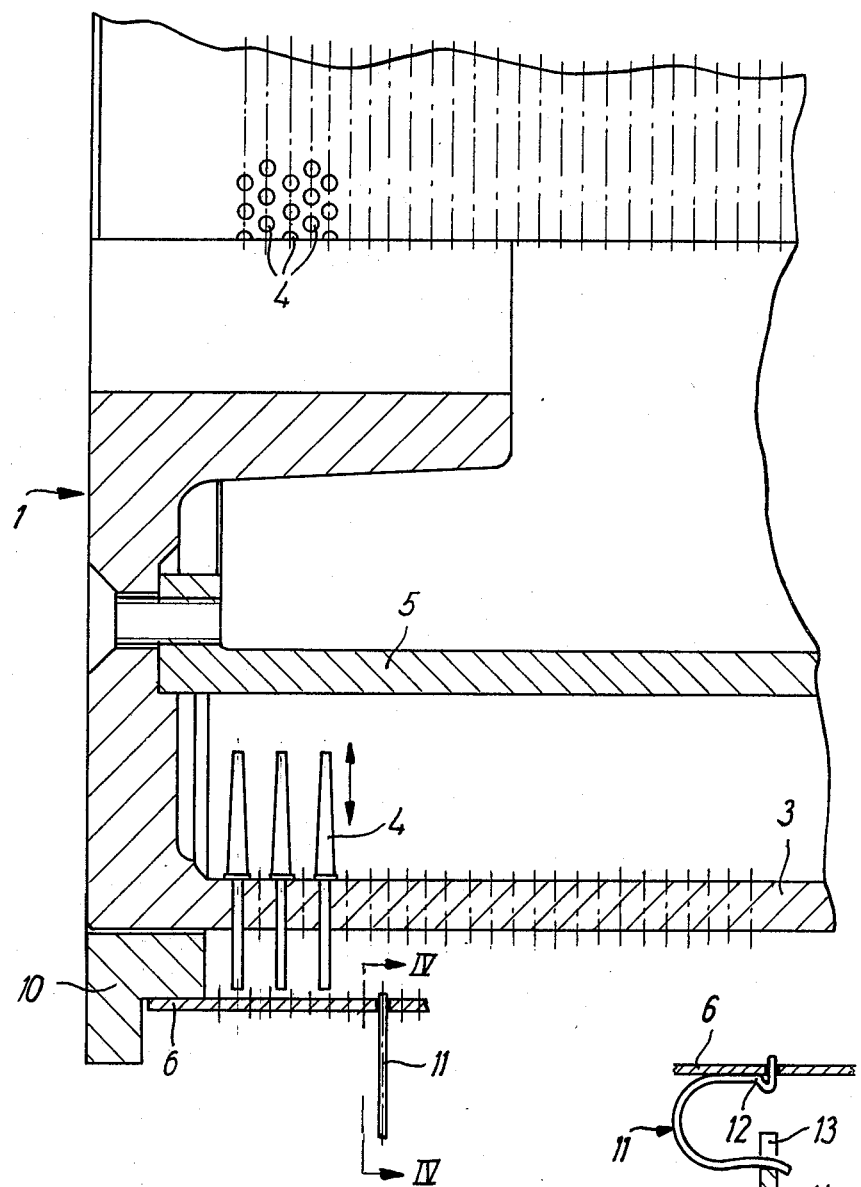
FIG. 3 is a fractional view on a larger scale along line III—III in FIG. 1.
FIG. 4 is a section along line IV—IV in FIG. 3.

The apparatus illustrated in FIGS. 1–4 comprises two rollers 1 and 2 which are mounted above one another, and which are caused to rotate in opposite directions of rotation, as indicated by arrows, by means of a drive mechanism (not shown) which may be of conventional design. As shown in FIG. 3 each roller comprieses a cylindrical web 3 having a large number of radially extending through bores located in a regular area or a grid pattern, and a pressing rod 4 is mounted with a sliding fit in each aperture or bore. Outward movement of the rods 4 is limited by collars thereon which may engage with the inner surface of web 3, and their inward movement is limited by a tubular insert 5 which may be secured to the roller after the rods have been mounted. A curved support plate or sheet 6 extends, as shown in FIG. 1, approximately 180° along the periphery of roller 1, coaxial with the roller and with a radial spacing from the peripheral surface thereof which is somewhat larger than the maximum thickness of a shrimp. One end of sheet 6 is secured to an inclined inlet chute 7 through which shrimps are supplied to the gap between the roller and the sheet. The opposite end of sheet 6 is located at a short distance from the peripheral surface of roller 2, which latter roller is surrounded by a corresponding curved sheet 8 extending along approximately 180° of roller 2 with its inlet spaced rather closely from the surface of roller 1 and with its upper discharge end located above an inclined discharge chute 9. As appears from FIG. 3 sheets 6 and 8 may be secured to stationary rings 10 which surround rollers 1 and 2 and which are secured to the stationary frame (not shown) of the apparatus.

That portion of each sheet 6 and 8, which extends parallel or equidistant to the associated roller 1 or 2, is pierced by a large number of holes arranged in rows parallel to the respective roller axis, and in each row the pitch or center distance between the rollers is constant while the holes in each pair of successive rows are slightly staggered in the longitudinal direction of the row, as indicated in FIG. 2. A pin 11, made of a suitable wire material, extends through each hole from the outer side of the sheet, and the portion of the pin, which is located just outside the sheet, is bent in S-shape to form an abutment 12, which defines the maximum projection of the pin from the inner surface of the sheet, see FIG. 4. The opposite end of each pin is suspended in a slot 13 in a bar 14 extending parallel to the roller axis, and the depth of slot 13 and the dimensions of pin 11 are chosen such that in the normal position of the pin, as shown in FIG. 4, the abutment 12 engages the outer surface of sheet 6 or 8, respectively, under the influence of a resilient force in the pin created by the mounting thereof.

For the sake of clarity, bar 14 has been shown only in FIG. 1, and for similar reasons FIG. 2 shows only some of the pins 11 mounted in sheet 6.

During rotation of rollers 1 and 2 the centrifugal forces acting upon rods 4 throw them outwardly until their collars engage the inner surface of web 3, as shown in FIG. 3. When a shrimp proceeds from chute 7 onto sheet 6 and further into the gap between that sheet and web 3 of the first roller 1, the shrimp, which in FIGS. 5–7 has been designated by 15, presses some of rods 4 inwardly, as shown in FIG. 5, and consequently some of the closely spaced rods 4 act as drivers for advancng the shrimp in the gap between the roller and the sheet while other rods act as pressing members, which exert a substantially uniform pressure on the entire lateral surface of the shrimp in the direction towards sheet 6 and pins 11 protruding inwardly from the sheet. As shown the end surfaces of pins 11 may be ground flat but alternatively they may be formed with pointed ends. Pins 11 act as cutting elements which cut or scratch the majority of the surface of the shrimp shell, more particular the area 16, which has been shown hatched in FIG. 7. During the passage of the shrimp through the gap area 16 is successively acted upon by the stationary pins 11, and due to the arrangement of the pins in the above mentioned staggered pattern or array there is obtained a highly uniform cutting or scratching effect on the entire area. The result is that the shell is broken into small flakes which adhere only very slightly to the shrimp meat, and which, consequently, can readily be romoved by a further treatment described below.

After the shell on one side of the shrimp has been broken as described between roller 1 and sheet 6, the shrimp moves on into the gap between the upper roller 2 and the associated sheet 8 in which gap the opposite side of the shrimp shell is subjected to the same treatment.

For peeling brown shrimp the peripheral speed of the pressing and advancing rollers may be about 3-5 m/s, the diameter of the pressing and advancing rods may be about 2.5 mm and the rods may be arranged with a pitch or center line distance of 3.5 to 5 mm. The cutting pins may have a diameter of about 1 mm and protrude about 1 mm from the supporting surface. As mentioned above the cutting elements are mutually staggered, preferably such that in the transverse direction of the supporting surface, i.e. perpendicular to the direction in which the shrimp advance, there is at least one cutting pin in each millimeter of the transverse width of the surface.

FIG. 6 illustrates an alternative embodiment of the pressing and advancing means which act upon the shrimp to straighten that surface thereof which faces sheet 6 or 8, respectively, so that the cutting pins 11 can exert their cutting action upon the shell. The required pressing forces are in FIG. 6 provided by a sleeve 17 made of a suitably resilient material, such a foam rubber or foamed plastics, which is secured to the web of a roller (not shown) and which will be compressed locally by a shrimp advancing between the roller and the supporting surface 6 in which pins 11 are mounted.

Figure 8:
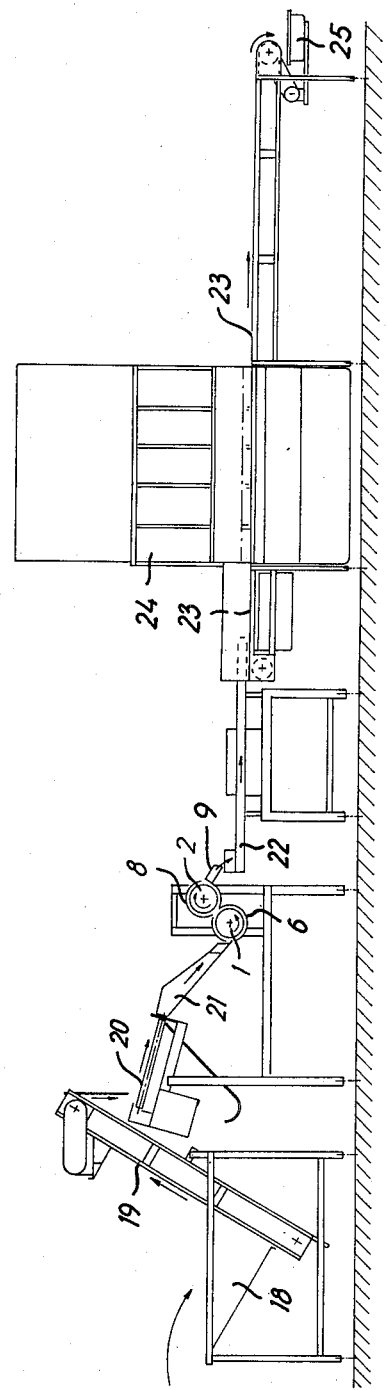
FIG. 8 is an elevation of a complete plant for peeling shrimps, embodying the described apparatus.

The complete plant, which has been illustrated rather schematically in FIG. 8, comprises a hopper 18 at the inlet end of the plant. Charges of boiled shrimp may be supplied to the hopper 18 from which a band conveyer 19 advances them to a device 20 in which the tail shell of the shrimp is loosened by means of oscillating pinching rollers. Devices of this kind are commonly known in the art and are described inter alia in the specification of U.S. Pat. No. 2,429,828 issued Oct. 28, 1947 to F. S. Lapeyre and J. M. Lapeyre. From device 20 the shrimp slides through a chute 21 corresponding to the above mentioned chute 7 down into the apparatus described above in which the two sides of the shell of each shrimp is sucessively broken between roller 1 and sheet 6 and between roller 2 and sheet 8. From the discharge end of sheet 8 the shrimps are delivered to a tube 22, which is coupled to a vibrating mechanism (not shown) which causes the tube to oscillate in the horizontal plane perpendicular to the longitudinal direction of the tube. Water is supplied at the shrimp inlet end of tube 22 and when the shrimps advance to the discharge end of the tube, they are subjected to a gentle rippling action which has proved sufficient for practically speaking completely separating the edible shrimp meat from the broken shells. From tube 22 the shrimp meat and the shells are delivered to a foraminous conveyor band 23, and when the water has been drained off in the first part of the conveyor band, the shrimps are subjected to an upward stream of air, which is created in a device 24 by means of blower (not shown). The air stream blows the shells away from the shrimp meat which proceeds on the conveyor band to the discharge end thereof. On the final part of the conveyor band following device 24 the shrimp meat may be inspected and, if desired, cleaned manually. The cleaned shrimp meat is then discharged into suitable transport containers 25.

It may be remarked that the described pre-treatment of the shrimps in order to remove the tail shell or fin will normally only be necessary when peeling shrimp species, such as the brown or common shrimp, the tail fin of which adheres rather strongly to the remainder of the shrimp. With other shrimp species this process step may be omitted.

What I claim is:

1. Apparatus for mechanically peeling shrimp and similar crustaceans, comprising:
    a first support means defining a concave cylindrical first shrimp supporting surface having an inlet end and an outlet end angularly spaced from said inlet end;
    a rotatable first roller coaxial with said first shrimp supporting surface and defining therewith a first elongated gap of substantially constant depth perpendicular to said shrimp supporting surface and extending angularly from the inlet end to the outlet end thereof;
    a second support means defining a concave cylindrical second shrimp supporting surface having an inlet end and an outlet end angularly spaced from said inlet end;
    a rotatable second roller coaxial with said second shrimp supporting surface and defining therewith a second elongated gap of substantially constant depth perpendicular to said shrimp supporting surface and extending angularly from the inlet end to the outlet end thereof;
    said outlet end of said first shrimp supporting surface being located adjacent and substantially tangential to the peripheral surface of said second roller, and said inlet end of said second shrimp supporting surface being located adjacent and substantially tangential to the peripheral surface of said first roller;
    a plurality of stationary cutting elements projecting from each of said shrimp supporting surfaces towards the roller associated with each respective surface; and
    drive means for rotating said first and second rollers in opposite directions, whereby the rotating rollers cause a shrimp fed into said first elongated gap between said first shrimp supporting surface and said first roller at the inlet end of said first surface to be sequentially advanced through said gaps and at the same time pressed towards the projecting cutting elements.

2. Apparatus as claimed in claim 1, wherein said cutting elements are pins, each of which extends with a radial clearance through an aperture in the associated shrimp supporting surface, and wherein there is provided abutment means associated with each pin for defining a maximum distance from said associated shrimp supporting surface to the cutting end of said pin, and spring means biasing each pin against the associated abutment means.

3. Apparatus as claimed in claim 1, in which the peripheral surface of each of said rollers is perforated by a plurality of evenly distributed apertures, and comprising a plurality of rods each mounted for radial movement in one of said apertures and provided with stop means for limiting its movement outwardly from the rotational axis of said roller, said rods constituting the means for advancing shrimps through said first and second gaps and pressing them towards said cutting elements.

4. Apparatus as claimed in claim 3, wherein said rods are arranged in a regular array in the peripheral surface of said roller.

* * * * *